(12) United States Patent
Fuke

(10) Patent No.: US 8,939,869 B2
(45) Date of Patent: Jan. 27, 2015

(54) VEHICLE OPERATION ASSIST APPARATUS

(75) Inventor: Tetsuya Fuke, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/128,716

(22) PCT Filed: Jun. 6, 2012

(86) PCT No.: PCT/JP2012/064545
§ 371 (c)(1),
(2), (4) Date: Dec. 23, 2013

(87) PCT Pub. No.: WO2013/001998
PCT Pub. Date: Jan. 3, 2013

(65) Prior Publication Data
US 2014/0129099 A1    May 8, 2014

(30) Foreign Application Priority Data

Jun. 29, 2011   (JP) ................................. 2011-143624

(51) Int. Cl.
*B60W 10/04* (2006.01)
*B60Q 1/00* (2006.01)
*F02D 29/02* (2006.01)
*B60W 50/14* (2012.01)
*B60K 35/00* (2006.01)
*F02D 41/02* (2006.01)
*F02D 11/10* (2006.01)
*F02D 41/22* (2006.01)

(52) U.S. Cl.
CPC .............. *F02D 29/02* (2013.01); *B60W 50/14* (2013.01); *B60K 35/00* (2013.01); *F02D 41/0225* (2013.01); *F02D 11/105* (2013.01); *B60K 2350/1092* (2013.01); *B60W 2050/146* (2013.01); *B60W 2510/1005* (2013.01); *B60W 2540/10* (2013.01); *Y02T 10/56* (2013.01); *F02D 2041/228* (2013.01); *F02D 2200/501* (2013.01); *F02D 2200/602* (2013.01)
USPC .......................................... 477/111; 340/439

(58) Field of Classification Search
USPC ............................... 477/111; 701/51; 340/439
See application file for complete search history.

(56) References Cited

U.S. PATENT DOCUMENTS 7,024,306 B2 * 4/2006 Minami et al. ................ 701/123
7,843,319 B2 * 11/2010 Pfisterer ........................ 340/441
7,852,201 B2 * 12/2010 Rains et al. ................... 340/438

(Continued)

FOREIGN PATENT DOCUMENTS

JP    2006-46149 A    2/2006
JP    2006-347214 A   12/2006

(Continued)

*Primary Examiner* — Dirk Wright
(74) *Attorney, Agent, or Firm* — Foley & Lardner LLP

(57) ABSTRACT

Depression of an accelerator pedal by a vehicle operator in an operating condition in which fuel economy is deteriorated, is restrained. An actual opening degree of the accelerator pedal and a reference guide value of the accelerator pedal opening degree which allows a vehicle to accomplish both acceleration performance and fuel economy performance in a current operating condition are indicated in a display section together. In a case where a current gear ratio of a transmission is deviated from an optimal gear ratio of the transmission which is determined based on an operating condition of the vehicle, the reference guide value is changed such that engine output of the vehicle is decreased.

7 Claims, 5 Drawing Sheets

(56) References Cited

U.S. PATENT DOCUMENTS

| | | | |
|---|---|---|---|
| 8,026,801 B2 * | 9/2011 | Saito et al. | 340/441 |
| 8,364,357 B2 * | 1/2013 | Kraemer et al. | 701/51 |
| 2009/0251304 A1 | 10/2009 | Saito et al. | |
| 2013/0120126 A1 * | 5/2013 | Fuke et al. | 340/439 |

FOREIGN PATENT DOCUMENTS

| | | |
|---|---|---|
| JP | 2008-55949 A | 3/2008 |
| JP | 2008-105559 A | 5/2008 |

* cited by examiner

VEHICLE OPERATION ASSIST APPARATUS

TECHNICAL FIELD

The present invention relates to a vehicle operation assist apparatus that assists a driving operation by a vehicle operator, for instance, in order to enhance specific fuel consumption (fuel economy) of a vehicle.

BACKGROUND ART

Patent Literature 1 discloses a technology in which when accelerator opening degree Acc is less than predetermined first opening degree threshold value Aref1, it is judged that the accelerator opening degree Acc is sufficiently small and an energy efficiency of the vehicle is in a good state, and an ECO indicator is lighted up, whereas when the accelerator opening degree Acc is not less than predetermined second opening degree threshold value Aref2, it is judged that the accelerator opening degree Acc is too large and an energy efficiency of the vehicle is not in the good state, and the ECO indicator is extinguished. In addition, the Patent Literature 1 discloses that in a case where the accelerator opening degree Acc is not less than the predetermined first opening degree threshold value Aref1 and is less than predetermined second opening degree threshold value Aref2, if accelerator opening speed Va is less than predetermined opening speed threshold value Varef, it is judged that accelerator operation is good and an energy efficiency of the vehicle is in a good state, and the ECO indicator is lighted up, whereas in a case where the accelerator opening degree Acc is not less than the predetermined first opening degree threshold value Aref1 and is less than the predetermined second opening degree threshold value Aref2, if the accelerator opening speed Va is not less than the predetermined opening speed threshold value Varef, it is judged that accelerator operation is not good and an energy efficiency of the vehicle is not in the good state, and the ECO indicator is extinguished.

In a vehicle equipped with a manual transmission or a vehicle that is running in a so-called sport mode or a manual mode of an automatic transmission, fuel economy is enhanced by carrying out a shift-up operation when vehicle speed is increased by depressing an accelerator pedal, but fuel economy is deteriorated when a gear position (gear ratio) is retained without carrying out the shift-up operation.

In the above-described Patent Literature 1, the first opening degree threshold value Aref1 and the second opening degree threshold value Aref2 which are used upon judging turn-on/turn-off of the ECO indicator are set to increase as the vehicle speed becomes higher.

Specifically, in a case where the gear position (gear ratio) is retained without carrying out the shift-up operation when the vehicle speed is increased by depressing the accelerator pedal, as the vehicle speed becomes higher, the first opening degree threshold value Aref1 for lighting the ECO indicator is increased so that light-up of the ECO indicator is more facilitated. Therefore, there occurs such a fear that even when fuel economy is actually deteriorated, the ECO indicator is occasionally lighted up, so that a vehicle operator may be urged toward deterioration in fuel economy.

CITATION LIST

Patent Literature

Patent Literature 1: Japanese Patent Application Unexamined Publication No. 2008-055949

SUMMARY OF INVENTION

A vehicle operation assist apparatus of the present invention serves to indicate both an actual value of a parameter that is controlled by a vehicle operator in order to vary engine output of a vehicle and a reference guide value of the parameter which allows the vehicle to realize predetermined performance in a current operating condition, on a display section. In a case where a current gear ratio of a transmission is deviated from an optimal gear ratio of the transmission which is determined based on an operating condition of the vehicle, the reference guide value is changed such that the engine output of the vehicle is decreased. That is, in a case where a gear position (gear ratio) is retained without carrying out a shift-up operation when vehicle speed is increased by depressing an accelerator pedal, the reference guide value of the parameter that is controlled by the vehicle operator is changed such that the engine output of the vehicle is decreased.

According to the vehicle operation assist apparatus of the present invention, in a case where a gear position (gear ratio) is retained without carrying out a shift-up operation when vehicle speed is increased by depressing an accelerator pedal, that is, in a case where as vehicle speed is increased, a current gear ratio of a transmission is deviated from an optimal gear stage of the transmission which is determined based on an operating condition of a vehicle, a reference guide value of a parameter that is controlled by a vehicle operator is changed such that engine output of the vehicle is decreased. Therefore, depression of the accelerator pedal by the vehicle operation can be restrained, so that deterioration in fuel economy can be suppressed.

DESCRIPTION OF EMBODIMENTS

In the following, a vehicle operation assist apparatus according to an embodiment of the present invention is explained in detail by referring to the accompanying drawings. The vehicle operation assist apparatus according to the embodiment is constructed to use an accelerator pedal opening degree (an opening degree of an accelerator pedal) as a parameter representing an engine output which is controlled by a vehicle operator, and fulfill both fuel economy performance and acceleration performance in a current operating condition by the accelerator pedal opening degree. In addition, the present invention may be applied to a vehicle equipped with a manual transmission or a vehicle that is running in a so-called sport mode or a manual mode of an automatic transmission.

Figure 1:
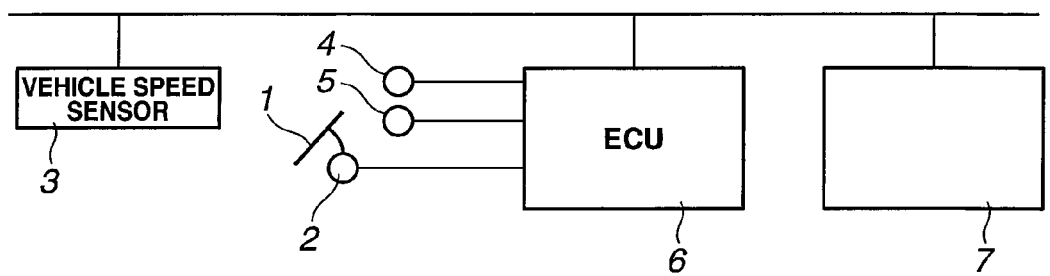
FIG. 1 is an explanatory diagram showing a construction of a vehicle operation assist apparatus according to an embodiment of the present invention.

FIG. 1 is an explanatory diagram showing a system construction of a vehicle operation assist apparatus according to the embodiment of the present invention. The vehicle operation assist apparatus includes accelerator pedal opening degree sensor 2 that is constituted of a potentiometer or the like and detects an amount of depression of accelerator pedal 1 (i.e., an accelerator pedal opening degree) which is depressed by a vehicle operator, vehicle speed sensor 3 that detects vehicle speed of a vehicle, shift position sensor 4 that detects a current gear ratio (gear stage) of a transmission (not shown), and crank angle sensor 5 that detects engine rotation speed. Detection signals from these sensors are inputted to engine control unit 6. Engine control unit 6 is configured to compute a reference guide value of the accelerator pedal opening degree which allows the vehicle to accomplish both acceleration performance and fuel economy performance in a current operating condition on the basis of vehicle speed detected by vehicle speed sensor 3 and a current gear stage of the transmission (not shown), and configured to indicate the reference guide value in display section 7 as explained later. Engine control unit 6 is also configured to compute a current actual accelerator pedal opening degree from the detection signal from accelerator pedal opening degree sensor 2 and indicate the actual accelerator pedal opening degree in display section 7. Further, engine control unit 6 is configured to conduct general control of an engine (not shown) constituted of a gasoline engine or a diesel engine and, in the case of the gasoline engine, control an opening degree of a throttle valve and a fuel injection quantity in accordance with the accelerator pedal opening degree, thereby regulating output of the engine.

Figure 2:
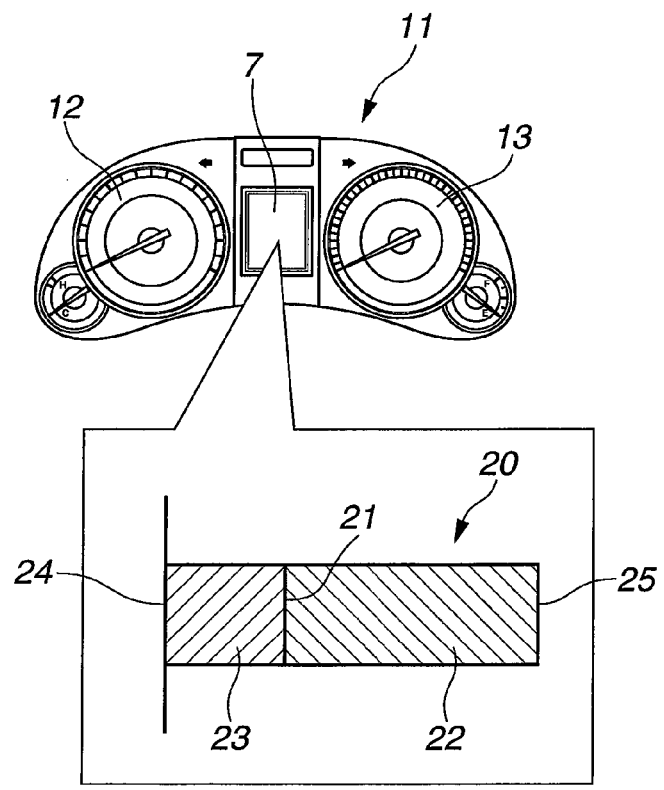
FIG. 2 is an explanatory diagram showing an example of a display section in an instrument panel of a vehicle operator's seat, according to the embodiment of the present invention.

FIG. 2 shows an example of instrument panel 11 of a vehicle operator's seat which includes display section 7. Display section 7 is disposed between vehicle speed meter 12 and tachometer 13, which is constituted of a liquid crystal display capable of indicating various kinds of information. Display section 7 constituted of the liquid crystal display is constructed to indicate various kinds of information as numerical indication such as temperature and time and various graphical indications which are selectively changeable by changeover between modes using an appropriate switch. Indication of the accelerator pedal opening degree according to the present invention is a bar-graphic indication (hereinafter referred to as "accelerator indicator 20") extending in a left-right direction as shown in the enlarged view of FIG. 2. In accelerator indicator 20, the above-described reference guide value (as indicated in numeral 21) is indicated as a boundary between good fuel economy region 22 in which the accelerator pedal opening degree is smaller than the reference guide value, and non-good fuel economy region 23 in which the accelerator pedal opening degree is larger than the reference guide value. Good fuel economy region 22 and non-good fuel economy region 23 are shown in colors different from each other.

The reason for indication of good fuel economy region 22 and non-good fuel economy region 23 between which the reference guide value (as indicated in numeral 21) is indicated as the boundary is as follows. The reference guide value is basically set based on a reference accelerator pedal opening degree for obtaining predetermined reference acceleration that allows the vehicle to realize predetermined acceleration performance in a current operating condition. However, in a case where as vehicle speed is increased, a current gear stage of the transmission is deviated from an optimal gear stage that is determined from an operating condition of the vehicle, the above-described reference acceleration in the operating condition is set based on a value corrected such that engine output is decreased. The reference guide value will be explained in detail later.

In addition, for instance, good fuel economy region 22 emits green light, and non-good fuel economy region 23 emits blue light. Reference guide value 21 of the accelerator pedal opening degree is shown in solid line in FIG. 2, but actually is indicated as a boundary between the regions light-emitting in two different colors. In this embodiment, an indication position of reference guide value 21 in which reference guide value 21 is indicated in accelerator indicator 20 is changed corresponding to change of the vehicle speed. Further, left end 24 of accelerator indicator 20 corresponds to a full-open degree of the accelerator pedal opening degree, and right end 25 of accelerator indicator 20 corresponds to a full-close degree of the accelerator pedal opening degree. These indication positions are always constant. FIG. 2 shows a full-close state in which accelerator pedal 1 is not depressed, and an entire portion of good fuel economy region 22 emits green light. When accelerator pedal 1 is depressed from the state shown in FIG. 2, accelerator indicator 20 is gradually extinguished from right end 25 in accordance with variation in the accelerator pedal opening degree. That is, a current actual accelerator pedal opening degree (i.e., an actual value of the accelerator pedal opening degree) is indicated by a boundary between a light emitting portion and a light extinguishing portion (in other words, at the right end position of the light emitting region).

Figure 3A:
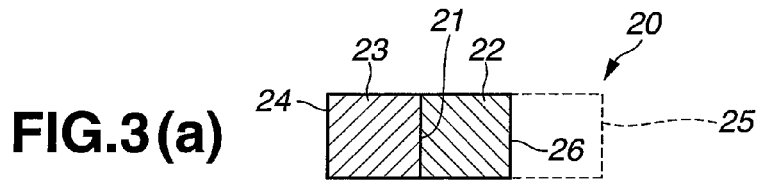
FIGS. 3(a)-3(c) are explanatory diagrams showing examples of indication of an accelerator indicator according to an embodiment of the present invention, FIG. 3(a) showing a state that an actual accelerator pedal opening degree is remarkably smaller than a reference guide value, FIG. 3(b) showing a state that the actual accelerator pedal opening degree is sufficiently close to the reference guide value, and FIG. 3(c) showing a state that the actual accelerator pedal opening degree exceeds the reference guide value.
Figure 3B:
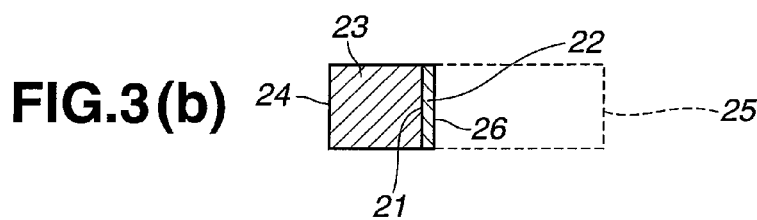
Figure 3C:
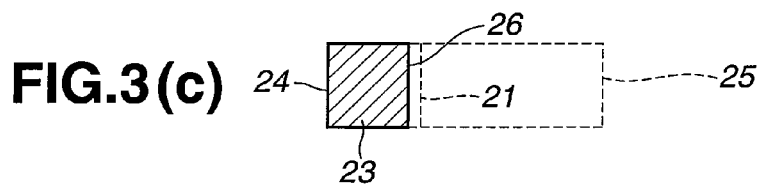

FIGS. 3(a)-3(c) show examples of indication of accelerator indicator 20. For instance, FIG. 3(a) shows a state in which actual accelerator pedal opening degree (as indicated in numeral 26) is remarkably smaller than reference guide value 21. In this state, as described above, non-good fuel economy region 23 emits blue light, and good fuel economy region 22 emits green light. Since the region emitting green light is large, the vehicle operator can recognize that there is still enough room until the actual accelerator pedal opening degree reaches reference guide value 21. FIG. 3(b) shows a state in which actual accelerator pedal opening degree 26 is sufficiently close to reference guide value 21. In this state, the region emitting green light is narrowed and decreased. The vehicle operator, therefore, can recognize that the actual accelerator pedal opening degree is close to reference guide value 21. Further, FIG. 3(c) shows a state in which actual accelerator pedal opening degree 26 exceeds reference guide value 21. In this state, the portion emitting green light disappears, and only the portion emitting blue light remains. The vehicle operator, therefore, can readily recognize that the actual accelerator pedal opening degree is excessively large.

Figure 4:
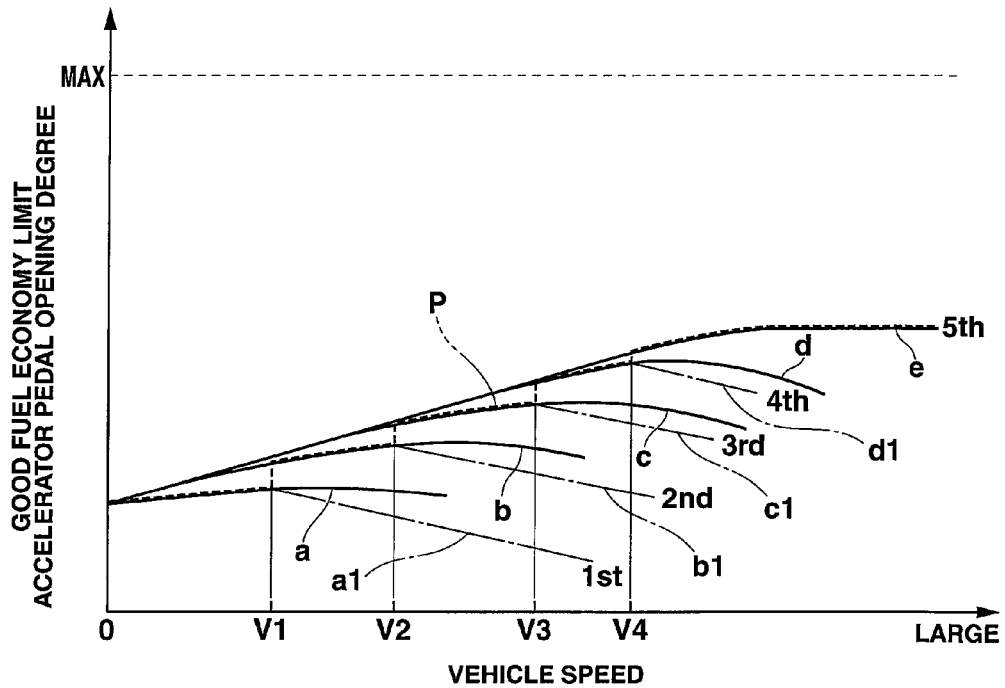
FIG. 4 is a characteristic diagram showing characteristics of a good fuel economy limit accelerator pedal opening degree, a reference accelerator pedal opening degree and a reduction correction opening degree, according to the embodiment of the present invention.

FIG. 4 is a characteristic diagram showing characteristics of a good fuel economy limit accelerator pedal opening degree (broken line) set such that the vehicle is allowed to accomplish both acceleration performance and fuel economy performance, a reference accelerator pedal opening degree (solid line) set each gear stage (gear ratio) of the transmission which is set with respect to vehicle speed, and a reduction correction opening degree (dashed line) set relative to the reference accelerator pedal opening degree for each gear stage (gear ratio) in a case where in accordance with increase in vehicle speed, a current gear ratio of the transmission is deviated from an optimal gear stage of the transmission which is determined based on an operating condition of the vehicle.

Characteristic curve "a" as indicated in solid line in FIG. 4 denotes the reference accelerator pedal opening degree when the gear stage of the transmission is first speed. Characteristic curve "b" as indicated in solid line in FIG. 4 denotes the reference accelerator pedal opening degree when the gear stage of the transmission is second speed. Characteristic curve "c" as indicated in solid line in FIG. 4 denotes the reference accelerator pedal opening degree when the gear stage of the transmission is third speed. Characteristic curve "d" as indicated in solid line in FIG. 4 denotes the reference accelerator pedal opening degree when the gear stage of the transmission is fourth speed. Characteristic curve "e" as indicated in solid line in FIG. 4 denotes the reference accelerator pedal opening degree when the gear stage of the transmission is fifth speed. Each of the reference accelerator pedal opening degrees "a" to "e" set each gear stage is set such that as the gear stage becomes larger, the reference accelerator pedal opening degree is increased in accordance with a difference in gear ratio between the gear stages under a condition that the vehicle speed is same.

In addition, characteristic curve "P" as indicated in broken line in FIG. 4 denotes the good fuel economy limit accelerator pedal opening degree that is the reference guide value of the accelerator pedal opening degree in a case where the vehicle is operated by selecting the optimal gear stage determined based on an operating condition of the vehicle. The good fuel economy limit accelerator pedal opening degree is an accelerator pedal opening degree that allows the vehicle to accomplish both acceleration performance and fuel economy performance, and is formed by connecting the above-described characteristic curves "a" to "e" with each other. That is, in a vehicle speed range from vehicle speed 0 to vehicle speed V1, the characteristic curve "P" has the same characteristic as that of the characteristic curve "a" in the same vehicle speed range. In a vehicle speed range from vehicle speed V1 to vehicle speed V2, the characteristic curve "P" has the same characteristic as that of the characteristic curve "b" in the same vehicle speed range. In a vehicle speed range from vehicle speed V2 to vehicle speed V3, the characteristic curve "P" has the same characteristic as that of the characteristic curve "c" in the same vehicle speed range. In a vehicle speed range from vehicle speed V3 to vehicle speed V4, the characteristic curve "P" has the same characteristic as that of the characteristic curve "d" in the same vehicle speed range. In a vehicle speed range not smaller than vehicle speed V4, the characteristic curve "P" has the same characteristic as that of the characteristic curve "e" in the same vehicle speed range. Further, the good fuel economy limit accelerator pedal opening degree at the vehicle speed V1 is actually set to become one of the reference accelerator pedal opening degree when the gear stage is first speed and the reference accelerator pedal opening degree when the gear stage is second speed. The good fuel economy limit accelerator pedal opening degree at each of the vehicle speed V2 to the vehicle speed V4 is set in the same manner as that in setting of the good fuel economy limit accelerator pedal opening degree at the vehicle speed V1.

The vehicle speed range from the vehicle speed 0 to the vehicle speed V1 is a vehicle speed range in which fuel economy is most enhanced when the gear stage of the transmission is first speed. The vehicle speed V1 corresponds to a good fuel economy limit vehicle speed that is a limit vehicle speed when the vehicle carries out good fuel economy running at first speed of the gear stage of the transmission. The vehicle speed range from the vehicle speed V1 to the vehicle speed V2 is a vehicle speed range in which fuel economy is most enhanced when the gear stage of the transmission is second speed. The vehicle speed V2 corresponds to a good fuel economy limit vehicle speed that is a limit vehicle speed when the vehicle carries out good fuel economy running at second speed of the gear stage of the transmission. The vehicle speed range from the vehicle speed V2 to the vehicle speed V3 is a vehicle speed range in which fuel economy is most enhanced when the gear stage of the transmission is third speed. The vehicle speed V3 corresponds to a good fuel economy limit vehicle speed that is a limit vehicle speed when the vehicle carries out good fuel economy running at third speed of the gear stage of the transmission. The vehicle speed range from the vehicle speed V3 to the vehicle speed V4 is a vehicle speed range in which fuel economy is most enhanced when the gear stage of the transmission is fourth speed. The vehicle speed V4 corresponds to a good fuel economy limit vehicle speed that is a limit vehicle speed when the vehicle carries out good fuel economy running at fourth speed of the gear stage of the transmission. The vehicle speed range not smaller than the vehicle speed V4 is a vehicle speed range in which fuel economy is most enhanced when the gear stage of the transmission is fifth speed.

Characteristic curve "a1" as indicated in dashed line in FIG. 4 denotes the reduction correction opening degree that is set when during the vehicle running at the first speed of the transmission, the optimal gear stage of the transmission which is determined based on an operating condition of the vehicle is shifted from the first speed to another speed larger than the first speed in accordance with increase in vehicle speed. Characteristic curve "b1" denotes the reduction correction opening degree that is set when during the vehicle running at the second speed of the transmission, the optimal gear stage of the transmission which is determined based on an operating condition of the vehicle is shifted from the second speed to another speed larger than the second speed in accordance with increase in vehicle speed. Characteristic curve "c1" denotes the reduction correction opening degree that is set when during the vehicle running at the third speed of the transmission, the optimal gear stage of the transmission which is determined based on an operating condition of the vehicle is shifted from the third speed to another speed larger than the third speed in accordance with increase in vehicle speed. Characteristic curve "d1" denotes the reduction correction opening degree that is set when during the vehicle running at the fourth speed of the transmission, the optimal gear stage of the transmission which is determined based on an operating condition of the vehicle is shifted from the fourth speed to the fifth speed in accordance with increase in vehicle speed. As the vehicle speed is increased, the reduction correction opening degree set for each of the gear stages becomes relatively smaller. In other words, each reduction correction opening degree is set such that as the vehicle speed becomes larger than the good fuel economy limit vehicle speed at the current gear stage, the reduction correction opening degree becomes smaller. In addition, each reduction correction opening degree is set such that the reduction correction opening degree becomes smaller relative to the corresponding reference accelerator pedal opening degree at same vehicle speed.

In a case where during the vehicle running at the optimal gear stage of the transmission which is determined based on an operating condition of the vehicle, the current gear stage is deviated from the optimal gear stage of the transmission which is determined based on an operating condition of the vehicle in accordance with increase in vehicle speed, the reference guide value is changed from the reference accelerator pedal opening degree corresponding to the current gear stage to the reduction correction opening degree corresponding to the current gear stage. For instance, in a case where accelerator pedal 1 is depressed at the first speed as the current gear stage so that the optimal gear stage of the transmission which is determined based on an operating condition of the vehicle is shifted from the first speed to the second speed in accordance with increase in vehicle speed, fuel economy will be deteriorated when the first speed is maintained without carrying out a shift-up operation. However, in this embodiment, in a case where the gear stage is kept at the first speed even when the optimal gear stage of the transmission which is determined based on an operating condition of the vehicle is shifted from the first speed to the second speed, the reference guide value that is indicated in display section 7 is changed from the reference accelerator pedal opening degree corresponding to the first speed to the reduction correction opening degree corresponding to the first speed so that the reference guide value is changed such that engine output is decreased.

Figure 5:
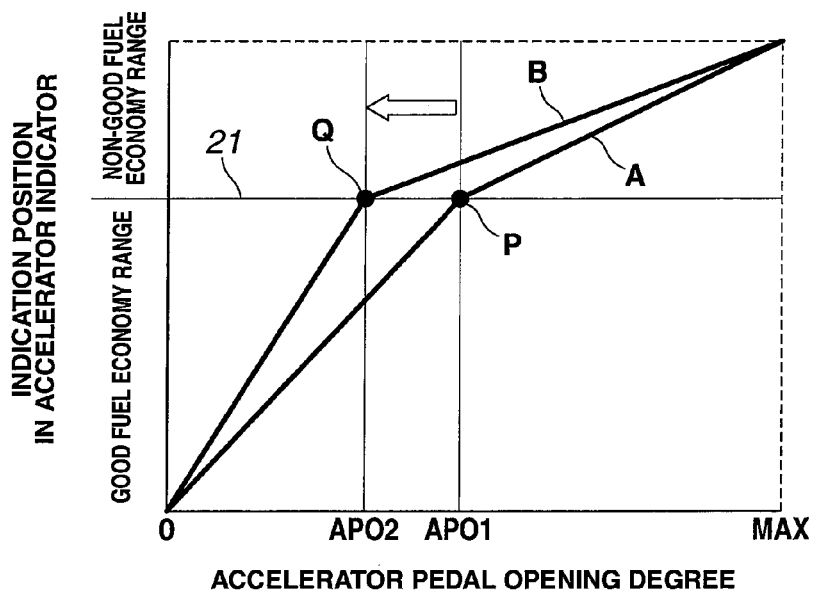
FIG. 5 is an explanatory diagram showing a relationship between accelerator pedal opening degree and indication position, according to the embodiment of the present invention.

Thus, the reference guide value is variably set in accordance with an operating condition of the vehicle. Further, as described above, the indication position of reference guide value 21 in accelerator indicator 20 is changed in accordance with change in vehicle speed. Accordingly, in accelerator indicator 20, actual accelerator pedal opening degree 26 is indicated as a ratio relative to reference guide value 21. FIG. 5 is an explanatory diagram showing a relationship between the accelerator pedal opening degree APO and the indication position of the accelerator pedal opening degree APO in accelerator indicator 20 (assuming that the position at right end 25 as shown in FIG. 3 is determined as 0), in which an abscissa represents accelerator pedal opening degree and an ordinate represents the indication position in accelerator indicator 20. In FIG. 5, characteristic line A denotes a characteristic exhibited when the reference guide value is APO1 in a case where the current gear stage of the transmission is the optimal gear stage of the transmission which is determined based on an operating condition of the vehicle. Solid line extending in a left-right direction as indicated by numeral 21 in FIG. 5 denotes an indication position of the reference guide value. Accordingly, the characteristic line A extends across intersection point P at which the solid line 21 and vertically extending solid line that denotes the reference guide value APO1 intersect with each other. Basically, the characteristic line A is linearly changed from a point at which the accelerator pedal opening degree APO is 0 (a point at a lower-left corner in FIG. 5) to the intersection point P, and is linearly changed from the intersection point P to a point at which the accelerator pedal opening degree APO is the full-open degree (a point at an upper-right corner in FIG. 5) with a gradient different from a gradient of a line segment of the characteristic line A which extends between the point 0 and the intersection point P.

Further, characteristic line B denotes a characteristic exhibited when the reference guide value is APO2 in a case where vehicle speed is increased within a range in which the indication position of the reference guide value is not changed, and in a case where in accordance with the increase in vehicle speed, the current gear stage of the transmission is deviated from the optimal gear stage of the transmission which is determined based on an operating condition of the vehicle. The characteristic line B also extends across intersection point Q at which the solid line 21 and vertically extending solid line that denotes the reference guide value APO2 intersect with each other. Basically, the characteristic line B is linearly changed from the point at which the accelerator pedal opening degree APO is 0 (the point at a lower-left corner in FIG. 5) to the intersection point Q, and is linearly changed from the intersection point Q to the point at which the accelerator pedal opening degree APO is the full-open degree (the point at an upper-right corner in FIG. 5) with a gradient different from a gradient of a line segment of the characteristic line B which extends between the point 0 and the intersection point Q.

Thus, in a case where in accordance with the increase in vehicle speed, the current gear stage of the transmission is deviated from the optimal gear stage of the transmission which is determined based on an operating condition of the vehicle, the reference guide value is changed from APO1 to APO2 so that the reference guide value is changed such that engine output of the vehicle is decreased. As a result, depression of accelerator pedal 1 by the vehicle operator can be restrained, so that deterioration of fuel economy can be suppressed.

Figure 6:
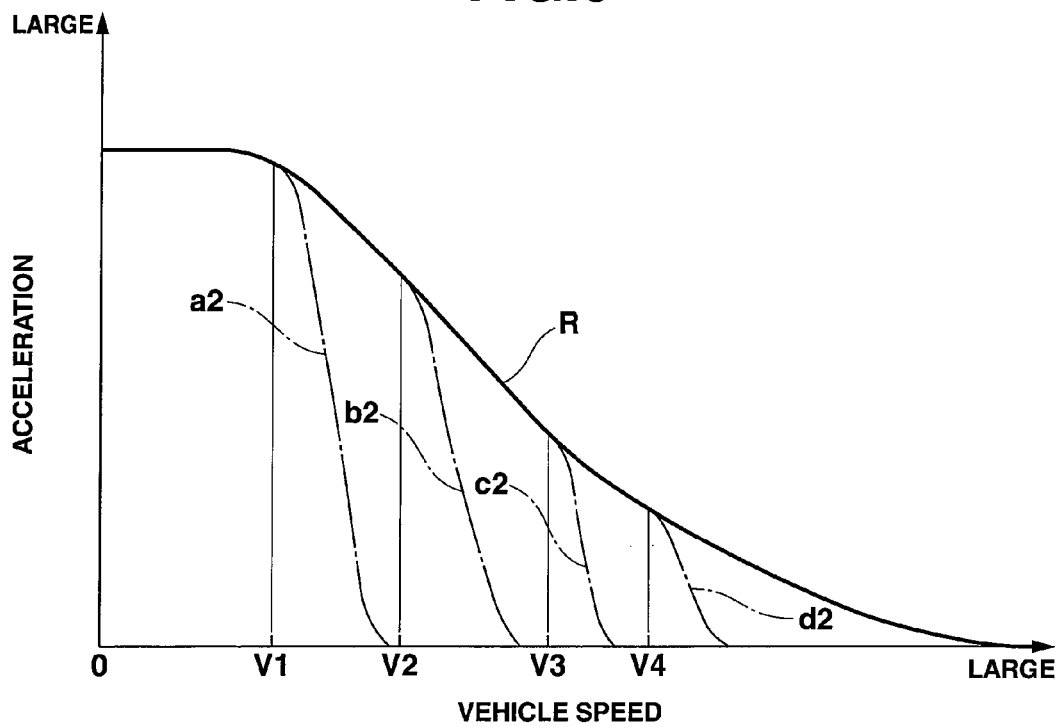
FIG. 6 is a characteristic diagram showing a relationship between vehicle speed and reference acceleration to be used in computation of the reference accelerator pedal opening degree according to the embodiment of the present invention.

Further, the reference acceleration that is used in computation of the reference accelerator pedal opening degree can be denoted by characteristic curve R as indicated in solid line in FIG. 6 in which an abscissa represents vehicle speed and an ordinate represents acceleration. In addition, characteristic curves a2, b2, c2 and d2 as indicated in dashed line in FIG. 6 are characteristic curves respectively denoting reduction correction accelerations that correspond to the reduction correction opening degrees respectively set when the gear stages are the first speed to the fourth speed. The characteristic curves a2, b2, c2 and d2 correspond to the characteristic curves a1, b1, c1 and d1 each indicated in dashed lines in FIG. 4.

That is, in a case where in accordance with increase in vehicle speed, a current gear stage (gear ratio) of the transmission is deviated from the optimal gear stage (gear ratio) of the transmission which is determined based on an operating condition of the vehicle, the above-described reference guide value may be set based on the reduction correction opening degree shown in each of the characteristic curves a2, b2, c2 and d2 which is a value obtained by making reduction correction of the reference acceleration in the operating condition of the vehicle such that engine output is decreased.

Further, as seen from FIG. 6, as the current vehicle speed becomes larger than the good fuel economy limit vehicle speed corresponding to the current gear stage (gear ratio) of the transmission, the value of the reduction correction acceleration becomes smaller. Therefore, in a case where in accordance with increase in vehicle speed, the current gear ratio of the transmission is deviated from the optimal gear ratio of the transmission which is determined based on an operating condition of the vehicle, the reference guide value may be set based on a value obtained by correcting the reference acceleration in a current operating condition such that engine output is decreased.

Figure 7:
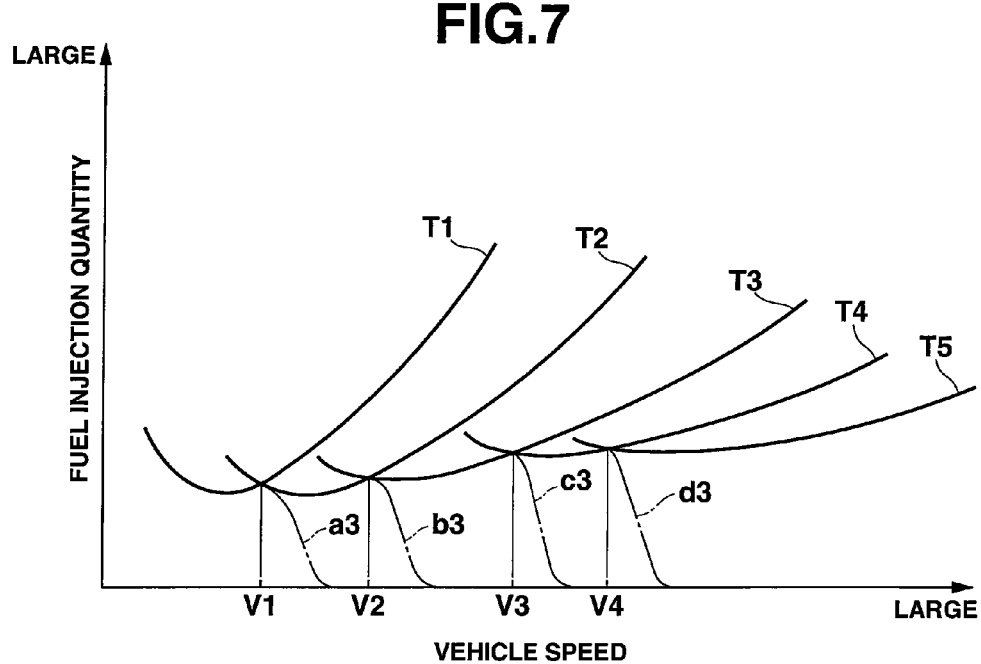
FIG. 7 is a characteristic diagram showing a relationship between vehicle speed and reference fuel injection quantity necessary to obtain the reference acceleration according to the embodiment of the present invention.

Further, a reference fuel injection quantity necessary to obtain the reference acceleration can be denoted by characteristic curves T1-T5 as indicated in solid line in FIG. 7 in which an abscissa represents vehicle speed and an ordinate represents fuel injection quantity. The characteristic curve T1 denotes a characteristic of the reference fuel injection quantity provided when the gear stage of the transmission is the first speed. The characteristic curve T2 denotes a characteristic of the reference fuel injection quantity provided when the gear stage of the transmission is the second speed. The characteristic curve T3 denotes a characteristic of the reference fuel injection quantity provided when the gear stage of the transmission is the third speed. The characteristic curve T4 denotes a characteristic of the reference fuel injection quantity provided when the gear stage of the transmission is the fourth speed. The characteristic curve T5 denotes a characteristic of the reference fuel injection quantity provided when the gear stage of the transmission is the fifth speed. In addition, characteristic curves a3, b3, c3 and d3 as indicated in dashed line in FIG. 7 are characteristic curves respectively denoting reduction correction fuel injection quantities that correspond to the reduction correction opening degrees respectively set when the gear stages are the first speed to the fourth speed. The characteristic curves a3, b3, c3 and d3 correspond to the characteristic curves a1, b1, c1 and d1 each indicated in dashed lines in FIG. 4.

That is, in a case where in accordance with increase in vehicle speed, a current gear stage (gear ratio) of the transmission is deviated from the optimal gear stage (gear ratio) of the transmission which is determined based on an operating condition of the vehicle, the above-described reference guide value may be set based on the reduction correction fuel injection quantity shown in each of the characteristic curves a3, b3, c3 and d3 which is a value obtained by making reduction correction of the reference fuel injection quantity in the operating condition such that engine output is decreased.

In addition, as seen from FIG. 7, as a current vehicle speed becomes larger than the good fuel economy limit vehicle speed corresponding to the current gear stage (gear ratio) of the transmission, the value of the reduction correction fuel injection quantity becomes smaller. Therefore, in a case where in accordance with increase in vehicle speed, the current gear ratio of the transmission is deviated from the optimal gear ratio of the transmission which is determined based on an operating condition of the vehicle, the reference guide value may be set based on a value obtained by correcting the reference fuel injection quantity in a current operating condition such that engine output is decreased.

Further, unless the gear stage of the transmission is shifted, as vehicle speed is increased, engine rotation speed becomes larger. Therefore, in a case where in accordance with increase in vehicle speed, the current gear stage (gear ratio) of the transmission is deviated from the optimal gear stage (gear ratio) of the transmission which is determined based on an operating condition of the vehicle, the reference guide value may be set based on a value obtained by correcting the reference acceleration in the operating condition or the reference fuel injection quantity in the operating condition such that engine output is decreased as a current engine rotation speed becomes larger than an engine rotation speed corresponding to same engine output in the optimal gear stage (gear ratio) of the transmission which is determined based on an operating condition of the vehicle, or as the current engine rotation speed becomes larger than a good fuel economy limit engine rotation speed at which the vehicle is allowed to carry out good fuel economy running with same engine output as a current engine output in the current gear stage (gear ratio) of the transmission.

Further, in a case where in accordance with increase in vehicle speed, the current gear ratio of the transmission is deviated from the optimal gear stage (gear ratio) of the transmission which is determined based on an operating condition of the vehicle, the reference guide value may be set based on a value obtained by correcting the reference acceleration in the operating condition of the vehicle or the reference fuel injection quantity in the operating condition of the vehicle such that engine output is decreased as a current fuel injection quantity becomes larger than a fuel injection quantity corresponding to same engine output in the optimal gear stage (gear ratio) of the transmission which is determined based on an operating condition of the vehicle, or as the current fuel injection quantity becomes larger than a good fuel economy limit fuel injection quantity in which the vehicle is allowed to carry out good fuel economy running with same engine output as a current engine output in the current gear ratio of the transmission.

Figure 8:
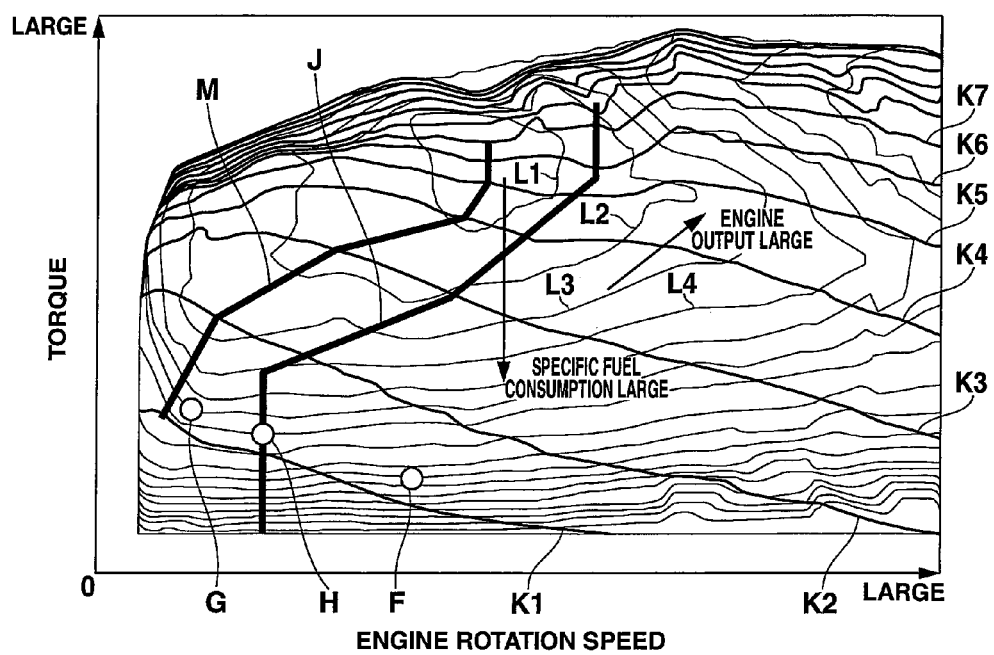
FIG. 8 is an explanatory diagram showing operating condition of a vehicle.

Referring to FIG. 8 that shows a relationship between torque, engine rotation speed, engine output and specific fuel consumption, the following explanation is given. In a case where an optimal gear stage of the transmission which is determined based on an operating condition of the vehicle is a fourth stage, point F shown in FIG. 8 denotes a current operating condition in which the gear stage is a third stage. At this time, point G shown in FIG. 8 denotes an operating condition in which engine output is the same as the engine output at point F and the gear stage of the transmission is the fourth stage. Point H shown in FIG. 8 denotes an operating condition in which a good fuel economy limit at which good fuel economy running can be carried out is reached when engine output is the same as the engine output at point F and the gear stage of the transmission is the third stage. At the point F that denotes the current operating condition, the fuel economy is deteriorated as compared to these at the point G and the point H.

From the above viewpoint, even in a case where the reference guide value is set based on a value obtained by correcting the reference acceleration in the operating condition or the reference fuel injection quantity in the operating condition such that engine output is decreased as the specific fuel consumption at the point F becomes larger than the specific fuel consumption at the point G, or as the specific fuel consumption at the point F becomes larger than the specific fuel consumption at the point H, the reference guide value is changed such that engine output of the vehicle is decreased. As a result, depression of accelerator pedal 1 is restrained, so that deterioration in fuel economy can be suppressed.

In addition, thick solid line J shown in FIG. 8 denotes a good fuel economy limit given in a case where the gear stage of the transmission is the third speed. Thick solid line M shown in FIG. 8 denotes a good fuel economy limit on a low speed side or a driving force limit necessary for running which is given in a case where the gear stage of the transmission is the fourth speed. Further, each of characteristic curves K (K1, K2, K3, K4, K5, K6, K7, and subsequent reference signs are omitted) denotes engine output. As indicated by arrow in FIG. 8, the engine output becomes larger from a lower-left side of FIG. 8 toward an upper-right side thereof. Further, each of characteristic curves L (L1, L2, L3, L4, and subsequent reference signs are omitted) denotes specific fuel consumption. As indicated by arrow in FIG. 8, the specific fuel consumption becomes larger toward an outside of the characteristic curve L1.

Figure 9:
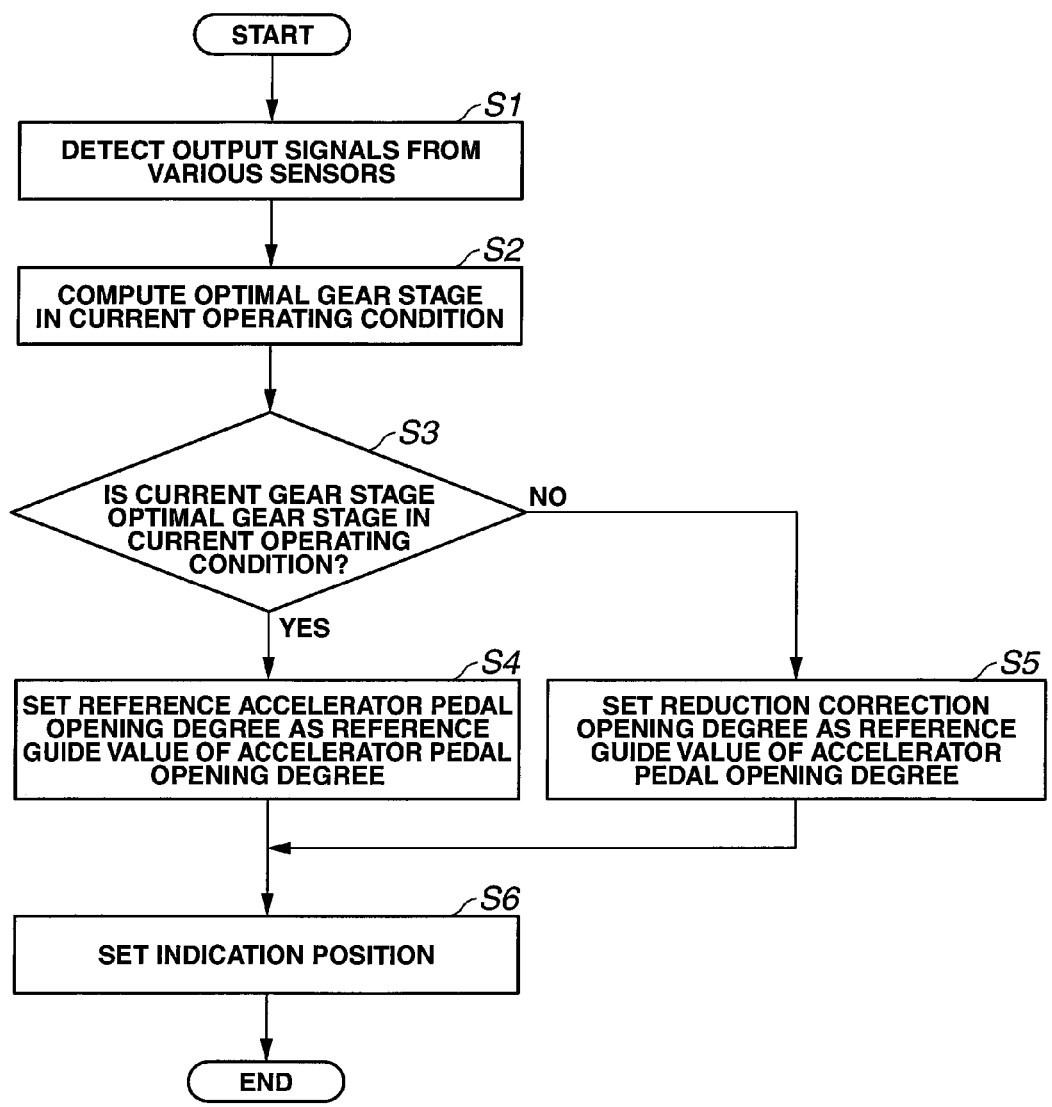
FIG. 9 is a flow chart showing a flow of reference guide value indication processing according to the embodiment of the present invention.

FIG. 9 is a flow chart showing a flow of reference guide value indication processing that is executed based on the characteristics as shown in FIG. 4.

In step S1, a current accelerator pedal opening degree is detected from an output signal from accelerator pedal opening degree sensor 2, a current vehicle speed is detected from an output signal from vehicle speed sensor 3, a current gear stage of the transmission is detected from an output signal from shift position sensor 4, and a current engine rotation speed is detected from an output signal from crank angle sensor 5. In step S2, an optimal gear stage of the transmission in a current operating condition is estimated by computation based on the current accelerator pedal opening degree and the current engine rotation speed.

In step S3, it is judged whether or not the current gear stage of the transmission is the optimal gear stage of the transmission in the current operating condition. If the current gear stage is the optimal gear stage in the current operating condition, the logic flow proceeds to step S4. If the current gear stage is not the optimal gear stage in the current operating condition, the logic flow proceeds to step S5.

In step S4, a reference accelerator pedal opening degree for obtaining a predetermined reference acceleration that allows the vehicle to realize a predetermined acceleration performance in the current operating condition is set as a reference guide value of the accelerator pedal opening degree, and the reference accelerator pedal opening degree as the reference guide value is computed based on the vehicle speed and the current gear stage of the transmission.

In step S5, a reduction correction opening degree that is smaller than the reference accelerator pedal opening degree is set as a reference guide value of the accelerator pedal opening degree, and the reduction correction opening degree as the reference guide value is computed based on the vehicle speed and the current gear stage of the transmission.

In step S6, an indication position of the reference guide value in accelerator indicator 20 is computed in accordance with the vehicle speed. For instance, a plurality of vehicle speed ranges such as a range below 40 km/h, a range not less than 40 km/h and less than 80 km/h, range not less than 80 km/h, are set, and the indication position of the reference guide value in accelerator indicator 20 is changed for each of the vehicle speed ranges. At this time, the higher the vehicle speed of the vehicle speed range becomes, the closer to a left side in FIG. 3 the indication position of the reference guide value in accelerator indicator 20 is set.

In the above-descried embodiment, the indication position of the reference guide value in accelerator indicator 20 is changed in accordance with vehicle speed. However, the indication position of the reference guide value in accelerator indicator 20 may be a constant position. Further, in the above-descried embodiment, the accelerator pedal opening degree is used as a parameter that is operated by a vehicle operator. However, another parameter that represents engine output, for instance, intake air quantity, fuel supply quantity, etc. may be used for the indication. Furthermore, display section 7 may be highlighted to thereby increase visibility to a vehicle operator.

In addition, the current gear ratio of the transmission may be estimated from vehicle speed and engine rotation speed without being detected by shift position sensor 4.

Further, the reference guide value is not limited to the value set based on the accelerator pedal opening degree for obtaining the predetermined reference acceleration that allows the vehicle to realize the predetermined acceleration performance. The reference guide value may also be set based on an accelerator pedal opening degree at which an operating range in which specific fuel consumption of the engine is relatively low (fuel economy is good) is shifted to an operating range in which specific fuel consumption of the engine is relatively high (fuel economy is bad). For instance, the reference guide value may be set as an accelerator pedal opening degree at which an operating condition of the engine is shifted to a fuel increase range (for instance, an engine high rotation speed range or an engine high load range). Otherwise, the reference guide value may be set based on an accelerator pedal opening degree at which a good fuel economy range (for instance, an engine intermediate rotation speed range and an engine intermediate load range) that is determined based on an engine operating condition is shifted to a bad fuel economy range.

The invention claimed is:

1. A vehicle operation assist apparatus comprising:
   a display section constructed to indicate both an actual value of a parameter that is operated by a vehicle operator in order to vary engine output of a vehicle, and a reference guide value of the parameter which allows the vehicle to realize a predetermined performance in a current operating condition, the display section serving to allow the vehicle operator to operate the parameter by using the reference guide value as an index; and
   a section configured to change the reference guide value such that the engine output of the vehicle is decreased, in a case where a current gear ratio of a transmission is deviated from a gear ratio of the transmission which is determined based on an operating condition of the vehicle and provides the reference guide value of the parameter which allows the vehicle to realize predetermined performance.

2. The vehicle operation assist apparatus as claimed in claim 1, wherein the parameter is an opening degree of an accelerator pedal of the vehicle, and the reference guide value is based on an opening degree of an accelerator pedal of the vehicle which is determined to obtain a predetermined reference acceleration that allows the vehicle to realize predetermined acceleration performance in a current operating condition, and
   wherein the section is configured to set the reference guide value based on a value obtained by correcting the reference acceleration in the operating condition or a reference fuel injection quantity necessary to obtain the reference acceleration in the operating condition such that the engine output of the vehicle is decreased, in a case where a current gear ratio of a transmission is deviated from a gear ratio of the transmission which is determined based on an operating condition of the vehicle and provides the reference guide value of the opening degree of the accelerator pedal which allows the vehicle to accomplish both acceleration performance and fuel economy performance.

3. The vehicle operation assist apparatus as claimed in claim 2, wherein the section is configured to set the reference guide value based on a value obtained by correcting the reference acceleration in the operating condition or the reference fuel injection quantity in the operating condition such that the engine output of the vehicle is decreased as a current vehicle speed becomes larger than a good fuel economy limit vehicle speed that is a limit vehicle speed when the vehicle carries out good fuel economy running in the current gear ratio of the transmission, in a case where a current gear ratio of a transmission is deviated from a gear ratio of the transmission which is determined based on an operating condition of the vehicle and provides the reference guide value of the opening degree of the accelerator pedal which allows the vehicle to accomplish both acceleration performance and fuel economy performance.

4. The vehicle operation assist apparatus as claimed in claim 2, wherein the section is configured to set the reference guide value based on a value obtained by correcting the reference acceleration in the operating condition or the reference fuel injection quantity in the operating condition such that the engine output of the vehicle is decreased as a current engine rotation speed becomes larger than an engine rotation speed corresponding to same engine output in the gear ratio of the transmission which is determined based on an operating condition of the vehicle and provides the reference guide value of the opening degree of the accelerator pedal which allows the vehicle to accomplish both acceleration performance and fuel economy performance, or as the current engine rotation speed becomes larger than a good fuel economy limit engine rotation speed at which the vehicle is allowed to carry out good fuel economy running with same engine output as a current engine output in the current gear ratio of the transmission, in a case where a current gear ratio of a transmission is deviated from a gear ratio of the transmission which is determined based on an operating condition of the vehicle and provides the reference guide value of the opening degree of the accelerator pedal which allows the vehicle to accomplish both acceleration performance and fuel economy performance.

5. The vehicle operation assist apparatus as claimed in claim 2, wherein the section is configured to set the reference guide value based on a value obtained by correcting the reference acceleration in the operating condition or the reference fuel injection quantity in the operating condition such that the engine output of the vehicle is decreased as a current fuel injection quantity becomes larger than a fuel injection quantity corresponding to same engine output in the gear ratio of the transmission which is determined based on an operating condition of the vehicle and provides the reference guide value of the opening degree of the accelerator pedal which allows the vehicle to accomplish both acceleration performance and fuel economy performance, or as the current fuel injection quantity becomes larger than a good fuel economy limit fuel injection quantity in which the vehicle is allowed to carry out good fuel economy running with same engine output as a current engine output in the current gear ratio of the transmission, in a case where a current gear ratio of a transmission is deviated from a gear ratio of the transmission which is determined based on an operating condition of the vehicle and provides the reference guide value of the opening degree of the accelerator pedal which allows the vehicle to accomplish both acceleration performance and fuel economy performance.

6. The vehicle operation assist apparatus as claimed in claim 1, wherein the display section is highlighted.

7. A vehicle operation assist apparatus comprising:
 means for indicating both an actual value of a parameter that is operated by a vehicle operator in order to vary engine output of a vehicle, and a reference guide value of the parameter which allows the vehicle to realize a predetermined performance in a current operating condition, the means serving to allow the vehicle operator to operate the parameter by using the reference guide value as an index; and
 means for changing the reference guide value such that the engine output of the vehicle is decreased, in a case where a current gear ratio of a transmission is deviated from a gear ratio of the transmission which is determined based on an operating condition of the vehicle and provides the reference guide value of the parameter which allows the vehicle to realize predetermined performance.

* * * * *